United States Patent
Saito (10) Patent No.: US 7,246,299 B2
(45) Date of Patent: Jul. 17, 2007

(54) DATA RECORDING MEDIUM, DATA RECORDING METHOD, AND DATA RECORDING APPARATUS, INCLUDING ADDITIONAL RECORDING FEATURES

(75) Inventor: Akiya Saito, Kanagawa (JP)

(73) Assignee: Sony Disc & Digital Solutions Inc., Tokyo (JP)

( * ) Notice: Subject to any disclaimer, the term of this patent is extended or adjusted under 35 U.S.C. 154(b) by 165 days.

(21) Appl. No.: 10/482,407

(22) PCT Filed: Apr. 8, 2003

(86) PCT No.: PCT/JP03/04440

§ 371 (c)(1),
(2), (4) Date: Jan. 9, 2004

(87) PCT Pub. No.: WO03/088223

PCT Pub. Date: Oct. 23, 2003

(65) Prior Publication Data

US 2004/0174791 A1    Sep. 9, 2004

(30) Foreign Application Priority Data

Apr. 12, 2002  (JP) .............................. 2002-110345

(51) Int. Cl.
    *H03M 13/00* (2006.01)
(52) U.S. Cl. ..................................... 714/756
(58) Field of Classification Search ................. 714/769
    See application file for complete search history.

(56) References Cited

U.S. PATENT DOCUMENTS

| 6,353,890 B1 * | 3/2002 | Newman ..................... 713/193 |
| 6,357,030 B1 * | 3/2002 | Demura et al. ............. 714/755 |
| 6,425,098 B1 * | 7/2002 | Sinquin et al. ............. 714/699 |
| 6,487,155 B1 * | 11/2002 | Carson et al. ........... 369/59.13 |
| 6,715,122 B2 * | 3/2004 | Carson et al. ............. 714/769 |
| 6,718,501 B1 * | 4/2004 | Brody et al. ................ 714/752 |
| 2003/0152009 A1 * | 8/2003 | Usui et al. ............... 369/59.25 |

FOREIGN PATENT DOCUMENTS

JP   2001-184654   7/2001
JP   2001-357536   12/2001

* cited by examiner

*Primary Examiner*—Guy Lamarre
*Assistant Examiner*—Sam Rizk
(74) *Attorney, Agent, or Firm*—Oblon, Spivak, McClelland, Maier & Neustadt, P.C.

(57) ABSTRACT

With data of four symbols (FIG. 11A), a parity of two symbols (FIG. 11B) is created. These six symbols are EFM-modulated. Each symbol of eight bits is converted into a pattern of 14 bits (FIG. 11C). In a pit/land sequence formed on a disc (FIG. 11D), two symbols are rewritten. One symbol is (0×40). When an additional recording process is performed for the bit/land sequence, the pit length becomes long (FIG. 11E). The reproduced 14-bit data is converted into eight bits on the reproducing side. Thus, the original data (0×40) is rewritten to (0×22). A parity is also changed so that the additionally recorded data symbol (0×22) is not detected as an error.

3 Claims, 14 Drawing Sheets

Fig. 1

PRIOR ART

RELATED ART

Fig. 11A  0x82  0xef  0x75  0x40

Fig. 11B  0xef  0x75  0xba  0xe2

Fig. 11G  0x82  0xef  0x75  0x22  0xba

DATA RECORDING MEDIUM, DATA RECORDING METHOD, AND DATA RECORDING APPARATUS, INCLUDING ADDITIONAL RECORDING FEATURES

TECHNICAL FIELD

The present invention relates to a data recording medium, a data recording method, and a data recording apparatus that are applicable for an optical disc of for example a read-only disc (ROM).

BACKGROUND ART

The standard about compact discs (CD), which have been widely used, is referred to as compact disc audio (CD-DA) and based on the description of a standard specification book called Redbook. Based on the specification, various formats for example CD-ROM have been standardized and so-called CD family has been set forth. In the following description, CD generally refers to discs of various formats included in the CD family.

A technology of which a laser beam is irradiated on a properly selected reflective film on a disc and thereby the lengths of pits are varied has been proposed. This recording process is sometimes referred to as additional recording process. When data is additionally recorded on the reflective film, for example identification information that identifies each disc can be recorded. When identification information is recorded in the CD format, a sub code of Q channel of the CD format can be used.

In a CD, an error correction code referred to as CIRC (Cross Interleave Reed-Solomon Code) is used. Thus, when data such as disc identification information is recorded on a reflective film, data that is additionally recorded is detected as an error and corrected with the CRIC. In this case, original data of which the additional recording process has not been performed is read. If the error that exceeds the error correction performance of the CIRC takes place, the error cannot be corrected and data cannot be read. Alternatively, data that has been additionally recorded cannot be read because an interpolating process is performed. Thus, so far, the proposed additional recording process has been performed for only an area in which the error correction code encoding process is not performed. Thus, the applicable range of the additional recording process is restricted.

DISCLOSURE OF THE INVENTION

An object of the present invention is to provide a data recording medium, a data recording method, and a data recording apparatus that allow an application range of the additional recording process to be extended.

To solve the foregoing problem, the present invention is a data recording medium having a reflective film, a part of data in a recording area being rewritten by recording data encoded with an error correction code to the reflective film so that the data is not detected as an error when the data is decoded.

The present invention is a data recording method for recording data on a data recording medium having a reflective film, a part of data in a recording area being rewritten by recording data encoded with an error correction code to the reflective film so that the data is not detected as an error when the data is decoded.

The present invention is a recording apparatus for recording data on a data recording medium having a reflective film, a part of data in a recording area being rewritten by recording data encoded with an error correction code to the reflective film so that the data is not detected as an error when the data is decoded.

According to the present invention, data is additionally recorded on a reflective film so that when the date is decoded, the data is not detected as an error. Thus, when data that has been encoded with an error correction code is decoded, a problem of which rewritten data cannot be read does not take place. According to the present invention, since data can be additionally recorded in an area that has been encoded with an error correction code, the applicable range of the additional recording process can be extended.

BEST MODES FOR CARRYING OUT THE INVENTION

Next, an embodiment of which the present invention is applied to the case that disc identification information (hereinafter referred to as UDI) is recorded on a disc shaped recording medium will be described. The UDI is information that identifies each disc. The UDI describes for example disc production company name, disc seller name, production factory name, year of production, serial number, time information, and so forth. According to the present invention, the additionally recorded information is not limited to the UDI, but desired information. The UDI is recorded in such a manner that can be read by a conventional CD player or a conventional CD-ROM drive. First of all, for easy understanding, the structure of an optical disc for example a CD will be described.

Figure 1:
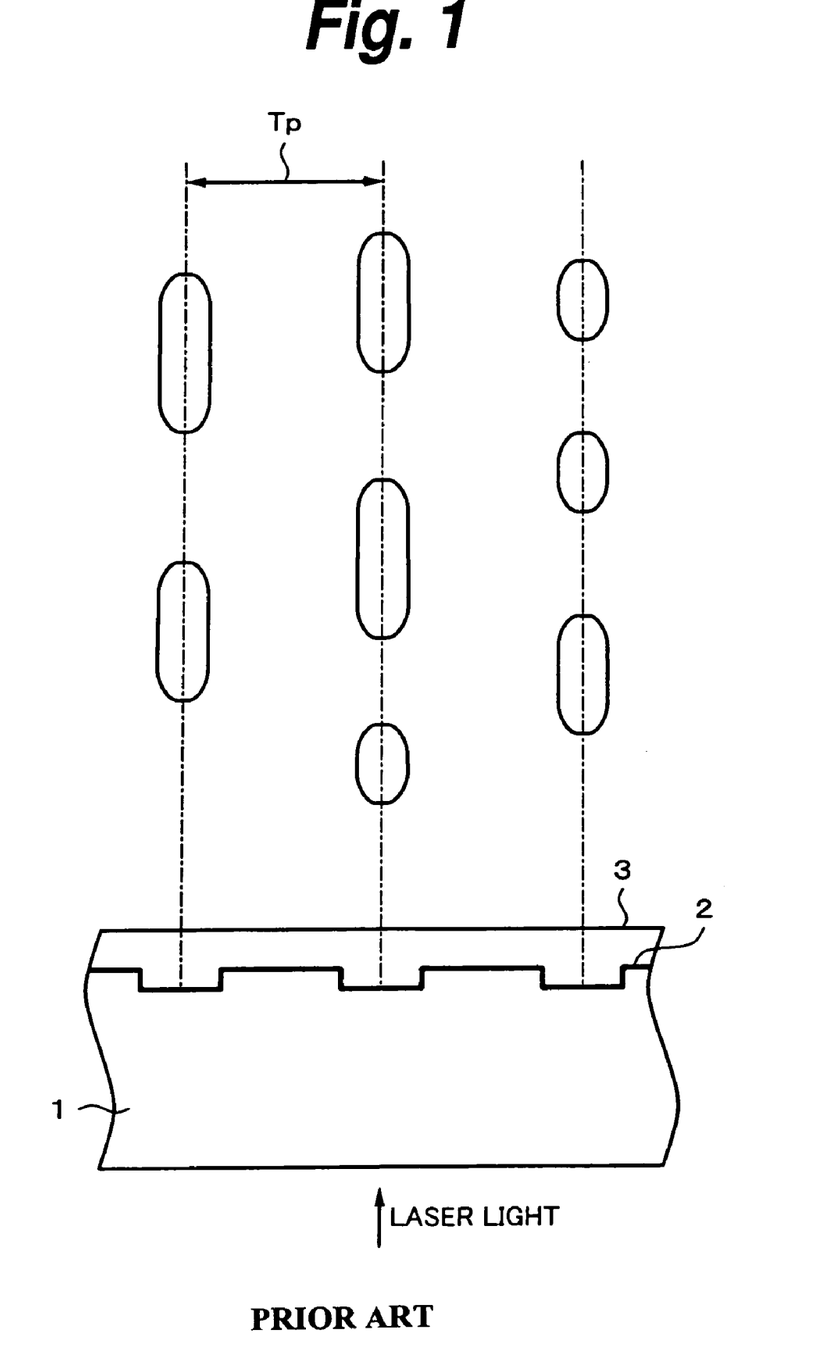
FIG. 1 is a schematic diagram describing a recording pattern and a structure of a conventional CD.

FIG. 1 is an enlarged view showing a part of a conventional CD. Concave portions that are referred to as pits and lands that are no-pit areas are alternately formed on tracks having a predetermined track pitch (for example, 1.6 μm). The lengths of pits and lands are in the range from 3T to 11T where T represents the minimum inversion interval. Laser light is irradiated from the rear surface of the CD.

The CD is composed of a transparent disc substrate 1 having a thickness of 1.2 mm, a reflective film 2 coated thereon, and a protection film 3 coated thereon. As the reflective film 2, one having a high reflectance is used. The CD is a read-only disc. However, as will be described later, after the reflective film 2 is coated, information (UDI) is recorded on the reflective film 2 with the laser light.

Next, with reference to FIG. 2, a flow of the production process of the CD will be described. At step S1, a glass master on which photo resist, which is a photosensitive material, is coated on a glass substrate is rotated by a spindle motor. Laser light that is turned on/off in accordance with a record signal is irradiated on the photo resist film. As a result, a master is produced. A developing process is performed for the photo resist film is developed. When the resist is of positive type, the exposed portion is melted. An uneven pattern is formed on the photo resist film.

The photo resist master is plated by an electroplating method. As a result, one metal master is produced (at step S2). With the metal master, a plurality of mothers are produced (at step S3). In addition, with the mother, a plurality of stampers are produced (at step S4). With the stamper, a disc substrate is produced. The disc substrate is produced by the compression molding method, the injection molding method, the light setting method, or the like. At step S6, a reflective film and a protection film are coated. In the conventional disc production method, a label is printed on the CD.

Figure 2:
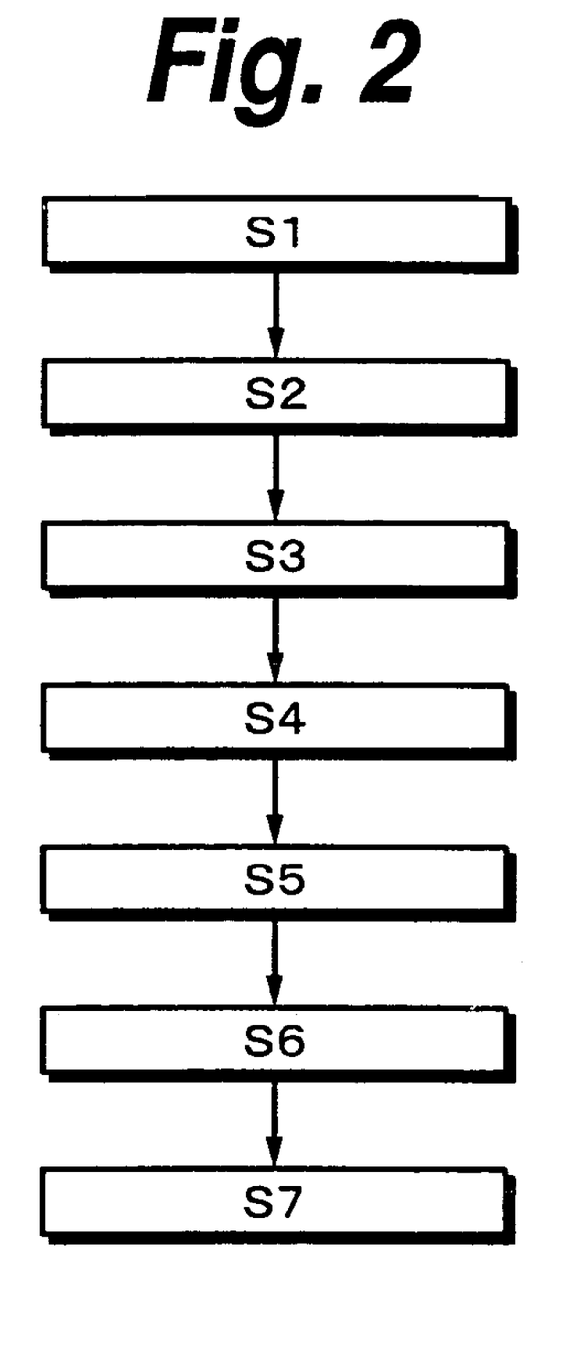
FIG. 2 is a schematic diagram describing a disc producing process according to an embodiment of the present invention.

In the example, shown in FIG. 2, laser light is irradiated to the reflective film (a mirror portion, for example a land). In addition, information is additionally recorded at step S7. Laser light is irradiated on the reflective film. The land on the reflective film is heated (thermally recorded). As a result, atoms are traveled and the film structure and crystallization are varied. Thus, the reflectance of the portion decreases. As a result, after laser light is irradiated on the land, the reflection of the laser light becomes small. Thus, a light detector recognizes the land as a pit. With this characteristics, the pit length can be varied so as to record information. In this case, the reflective film is made of a material that allows the reflectance thereof to be varied by laser irradiation. There is a material whose reflectance increases by the additional recording process.

In reality, the reflective film is made of an aluminum alloy $Al_{100-y}X_y$ where X is at least one element selected from a group consisting of Ge, Ti, Ni, Si, Tb, Fe, and Ag. The composition rate y of the Al alloy film is selected in the range of 5<y<50 [atomic %].

Alternatively, the reflective film may be also made of an Ag alloy film $Ag_{100-z}Y_z$ where Y is at least one element selected from a group consisting of Ge, Ti, Ni, Si, Tb, Fe, and Al. The composition rate z of the Al alloy film is selected in the range of 5<z<50 [atomic %]. The reflective film can be formed by for example the magnetron sputtering method.

For example, in the condition that the reflective film of AlGe alloy is formed with a thickness of 50 nm, laser light is irradiated from a transparent substrate side or a protection film side through an objective lens, if the composition rate of Ge is 20 [atomic %] and the recording power is in the range from 6 to 7 [mW], the reflectance decreases by around 6%. In such a condition, if the composition rate of Ge is 27.6 [atomic %] and the recording power is in the range from 5 to 8 [mW], the reflectance decreases by 7 to 8%. Since the reflectance varies in such a manner, the additional recording process can be performed for the reflective film.

Figure 3:
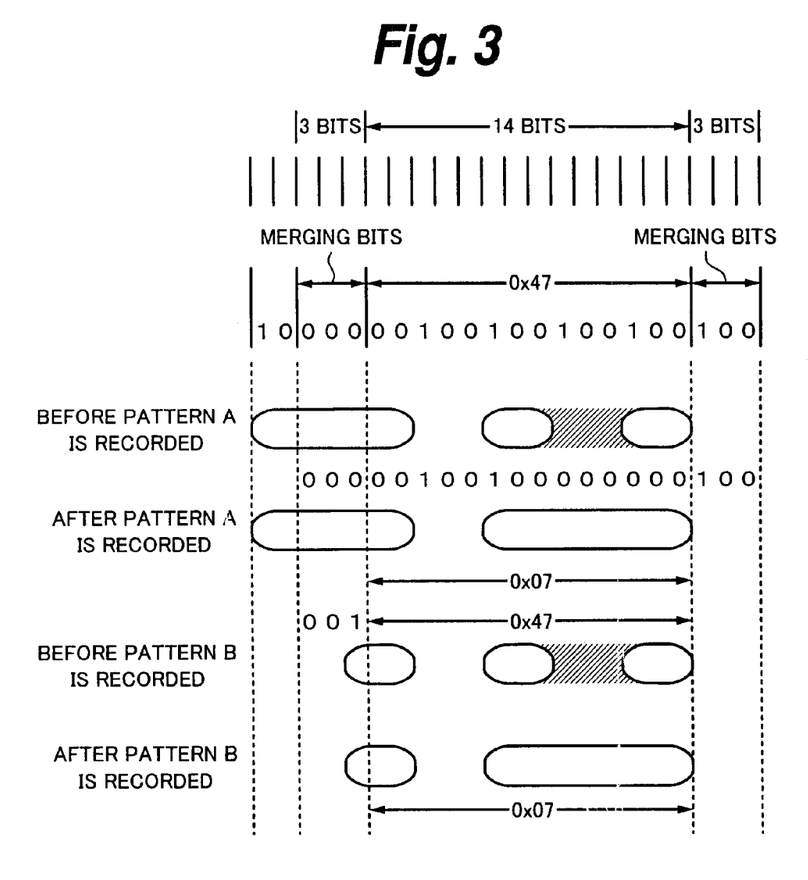
FIG. 3 is a schematic diagram describing an additional recording process according to the embodiment of the present invention.

FIG. 3 is a schematic diagram practically describing a method for additionally recording the UDI. There are two patterns depending on the preceding pattern. The two patterns are referred to as pattern A and pattern B.

First, the pattern A will be described. Three merging bits for example (000) are inserted between symbols. When the additional recording process is performed, a data symbol of eight bits is for example (0×47) where 0× represents hexadecimal notation. FIG. 3 shows a 14-bit pattern (00100100100100) of which the eight bits have been modulated in accordance with the EFM (eight to fourteen modulation) system.

A laser beam with which the additional recording process is performed is irradiated in a hatched area between the two pits. As a result, the reflectance of the hatched area decreases. After the additional recording process has been performed, two pits are connected and reproduced as one pit. In this case, the 14-bit pattern becomes (00100100000000). This is because when the 14-bit pattern is EFM-demodulated, it is demodulated as eight bits (0×07).

In the case of the pattern B, the merging bits are (001). In this case, as with the pattern A, when a laser beam is irradiated to the hatched area, eight bits can be varied from (0×47) to (0×07).

As described above, a data symbol (0×47) can be rewritten to (0×07). There are many types of data that can be additionally recorded. A data symbol (0×40) can be varied to (0×00). However, in the additional recording process, laser is irradiated to a mirror portion in which data has been recorded so as to vary the pit length. Thus, the types of data that can be additionally recorded are restricted.

Next, the error correction code encoding process used for a CD will be described. In a CD, as an error correction code encoding system, the CIRC that dually performs an error correction code encoding process with a C1 code sequence (in the vertical direction) and a C2 code sequence (in the diagonal direction). Data that has been encoded with an error correction code is EFM-modulated in the unit of one frame.

Figure 4:
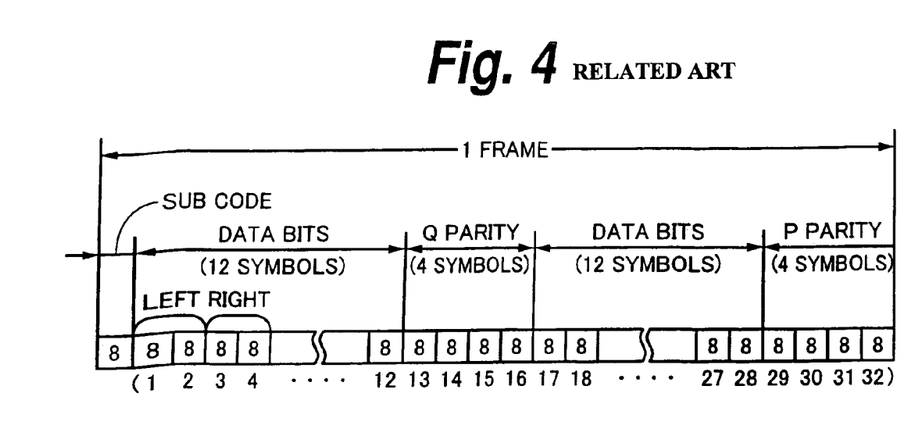
FIG. 4 is a schematic diagram describing a recording format of an optical disc according to the present invention.

FIG. 4 shows one frame of a data structure of a CD before the data has been EFM modulated. When audio data is sampled with 16 bits, as shown in FIG. 4, one frame is composed of data bits of 24 symbols that are equivalent to six sample words of each of L (left) and R (right) (one symbol is eight bits of which 16 bits are divided by two), a Q parity of four symbols, a P parity of four symbols, and a sub code of one symbol. Data of one frame (also referred to as one EFM frame) recorded on the disc is converted from eight bits into 14 bits in accordance with the EFM modulation. In addition, DC component suppression bits are added. Moreover, a frame sync is added.

Thus, one frame recorded on the disc is composed of:

| | |
|---|---|
| Frame sync | 24 channel bits |
| Data bits | 14 · 24 = 336 channel bits |
| Sub code | 14 channel bits |

| | |
|---|---|
| Parities | 14 · 8 = 112 channel bits |
| Merging bits | 3 · 34 = 102 channel bits |

Thus, the total number of channel bits of one frame is 588 channel bits.

In the EFM modulating system, each symbol (eight data bits) is converted into 14 channel bits. The minimum time width Tmin of the EFM modulation (the time width of which the number of 0s between 1s of a recording system) is 3T. The pit length equivalent to 3T is 0.87 μm. The pit length equivalent to T is the minimum pit length. In addition, three merging pits are placed between two blocks of 14 channel bits. Moreover, a frame sync pattern is added at the beginning of the frame. When the period of channel bits is T, a frame sync pattern is a pattern of which 11T, 11T, and 2T are successive. Such a pattern does not take place in the EFM modulation rule. Thus, a frame sync can be detected with a special pattern. One frame is composed of a total of 588 channel bits. The frame frequency is 7.35 kHz.

Figure 5:
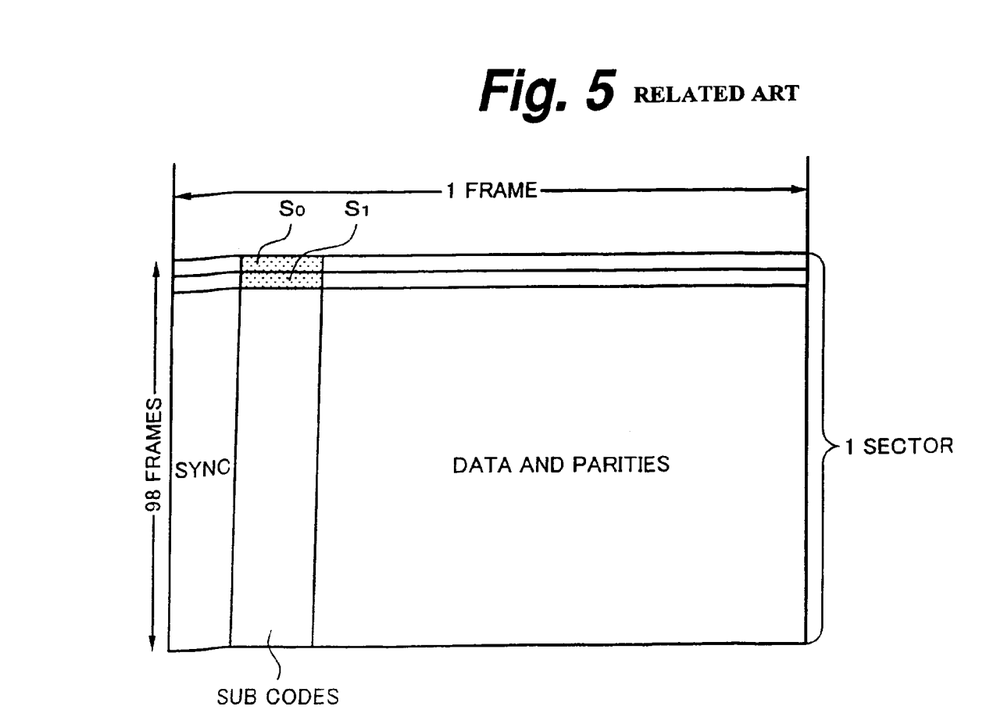
FIG. 5 is a schematic diagram describing a recording format of the optical disc according to the present invention.

A group of such 98 frames is referred to as sub code frame (or sub code block). The sub code frame is equivalent to $\frac{1}{75}$ second of a reproducing time of a conventional CD. FIG. 5 shows a sub code frame of which 98 frames are rearranged so that they are successive in the vertical direction. A sub code of one symbol of each frame includes one bit of each of eight channels P to W. As shown in FIG. 5, one sector is composed of a period (98 frames) that completes a sub code. Sub codes of two beginning frames of 98 frames are sub code frame syncs S0 and S1. When data of an optical disc is recorded on such as a CD-ROM disc, 98 frames (2,352 bytes) that is a unit of which sub codes are completed are one sector.

Figure 6:
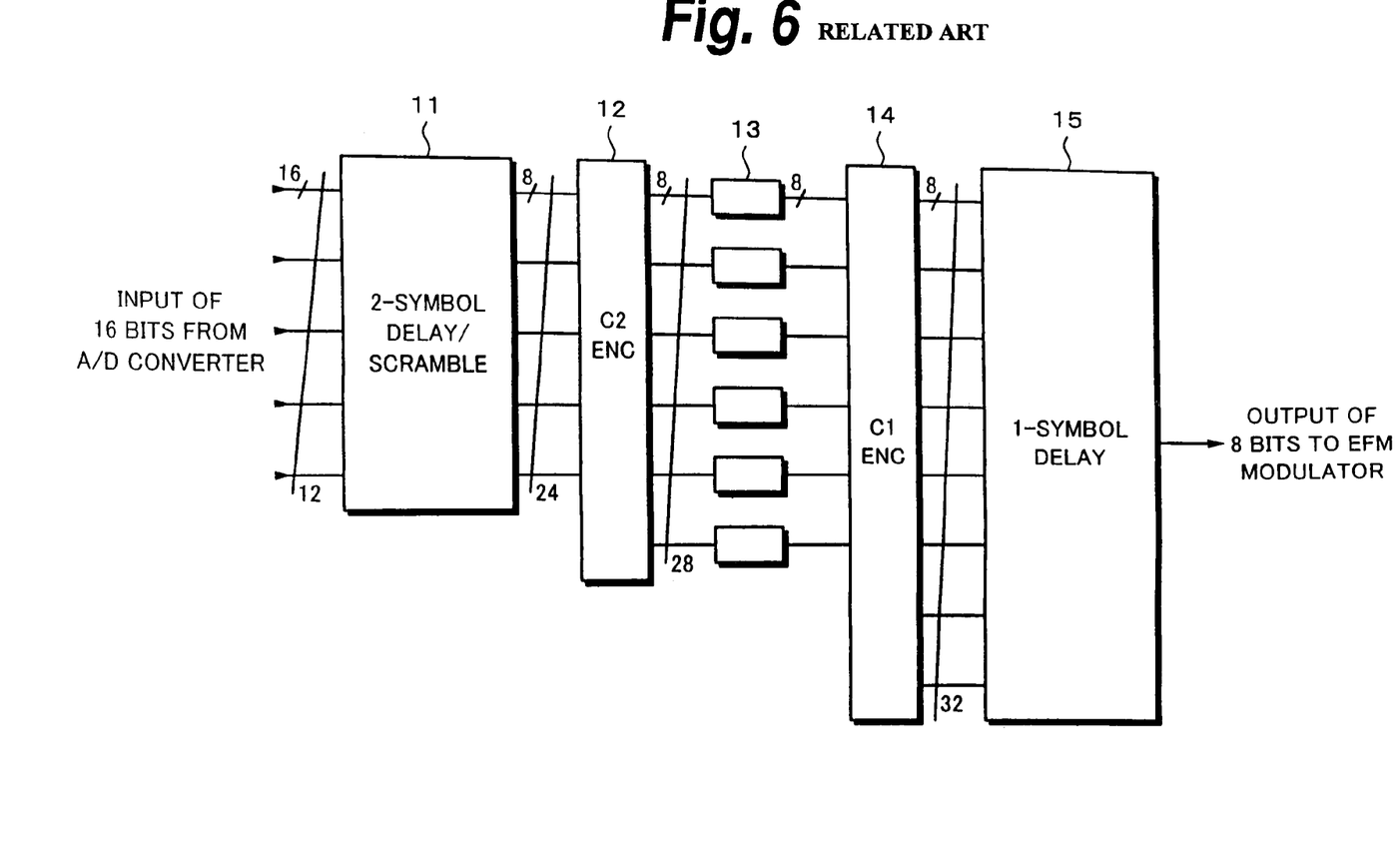
FIG. 6 is a block diagram showing an example of a CIRC encoder.
Figure 7:
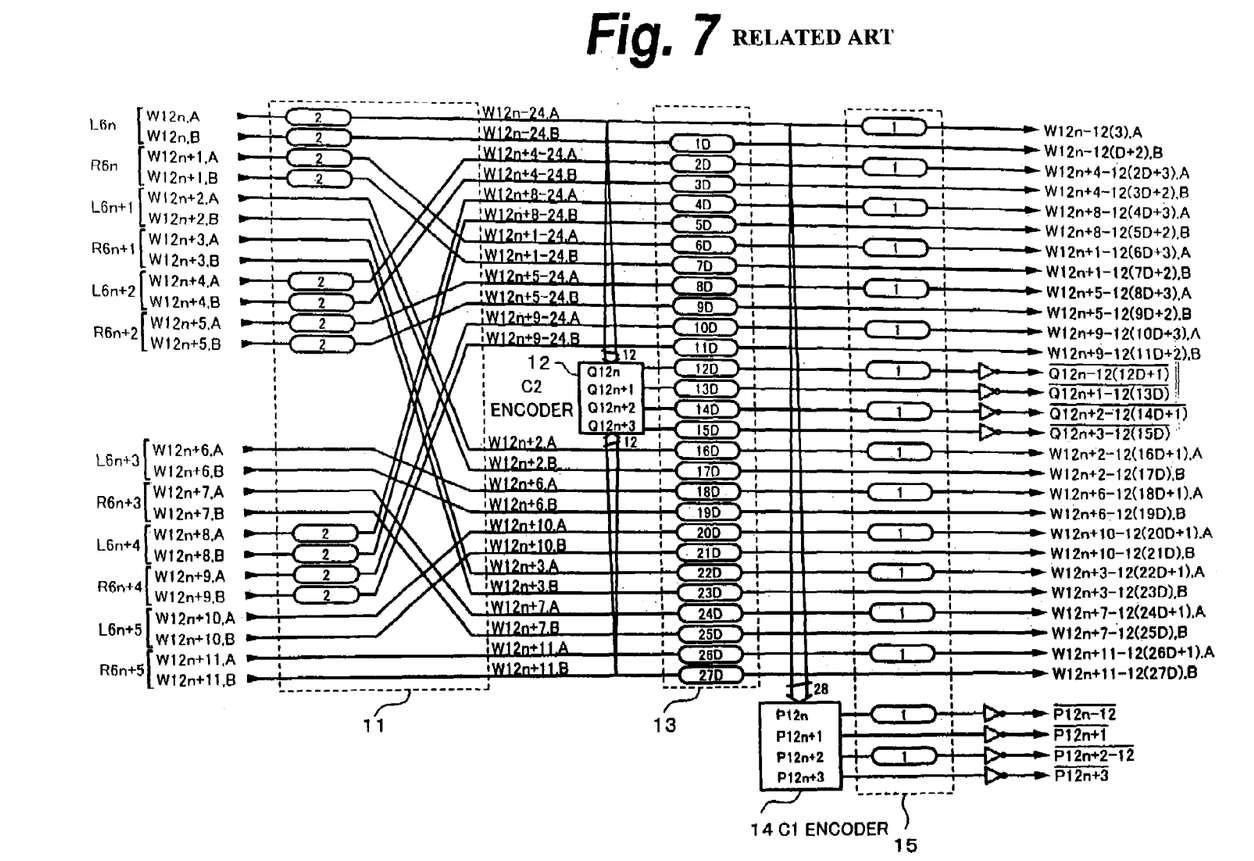
FIG. 7 is a more detailed block diagram showing the example of the CIRC decoder.

FIG. 6 and FIG. 7 are block diagrams showing a flow of an encoding process in accordance with the CIRC system. 24 symbols of which one word of an audio signal is divided into high order eight bits and low order eight bits) (W12$n$, A, W12$n$, B, . . . , W12$n$+12, A, W12$n$+11, B) (the high order eight bits are denoted by A, whereas the low order eight bits are denoted by B) are supplied to a two-symbol delay/scramble circuit 11. Even word data L6$n$, R6$n$, L6$n$+2, R6$n$+2, . . . are delayed by two symbols each. Even if all a sequence becomes error in a C2 encoder 12, it can interpolate the sequence. The two-symbol delay/scramble circuit 11 can scramble data so that the maximum burst error interpolation length can be obtained.

An output of the two-symbol delay/scramble circuit 11 is supplied to the C2 encoder 12. The C2 encoder 12 performs an encoding process with (28, 24, 5) Reed-Solomon code on GF (28) and generates a Q parity of four symbols Q12$n$, Q12$n$+1, Q12$n$+2, and Q12$n$+3. An output of 28 symbols of the C2 encoder 12 is supplied to an interleave circuit 13. When a unit delay amount is denoted by D, the interleave circuit 13 gives delay amounts that vary in arithmetic series such as 0, D, 2D, . . . , so that a first sequence of symbols is converted into a second sequence. The interleave circuit 13 disperses a burst error.

An output of the interleave circuit 13 is supplied to a C1 encoder 14. The C1 encoder 14 uses (32, 28, 5) Reed-Solomon code on GF (28) as a C1 code. The C1 encoder 14 generates a P parity of four symbols P12$n$, P12$n$+1, P12$n$+2, and P12+3. The minimum distance of each of the C1 code and the C2 code is 5. Thus, a two-symbol error can be corrected. A four-symbol error can be erasure-corrected (in the case that the position of an error symbol is known).

An output of 32 symbols of the C1 encoder 14 is supplied to a one-symbol delay circuit 15. The one-symbol delay circuit 15 makes adjacent symbols apart so as to prevent an error at the boundary of symbols from causing a two-symbol error. The Q parity is inverted by an inverter. Thus, even if data and parities become all zero, an error can be detected.

The interleave circuit 13 has a unit delay amount D=4 frames. Adjacent symbols are apart by four frames. In the CIRC4 system, the maximum delay amount is 27D (=108 frames). The total interleave length is 109 frames.

Figure 8:
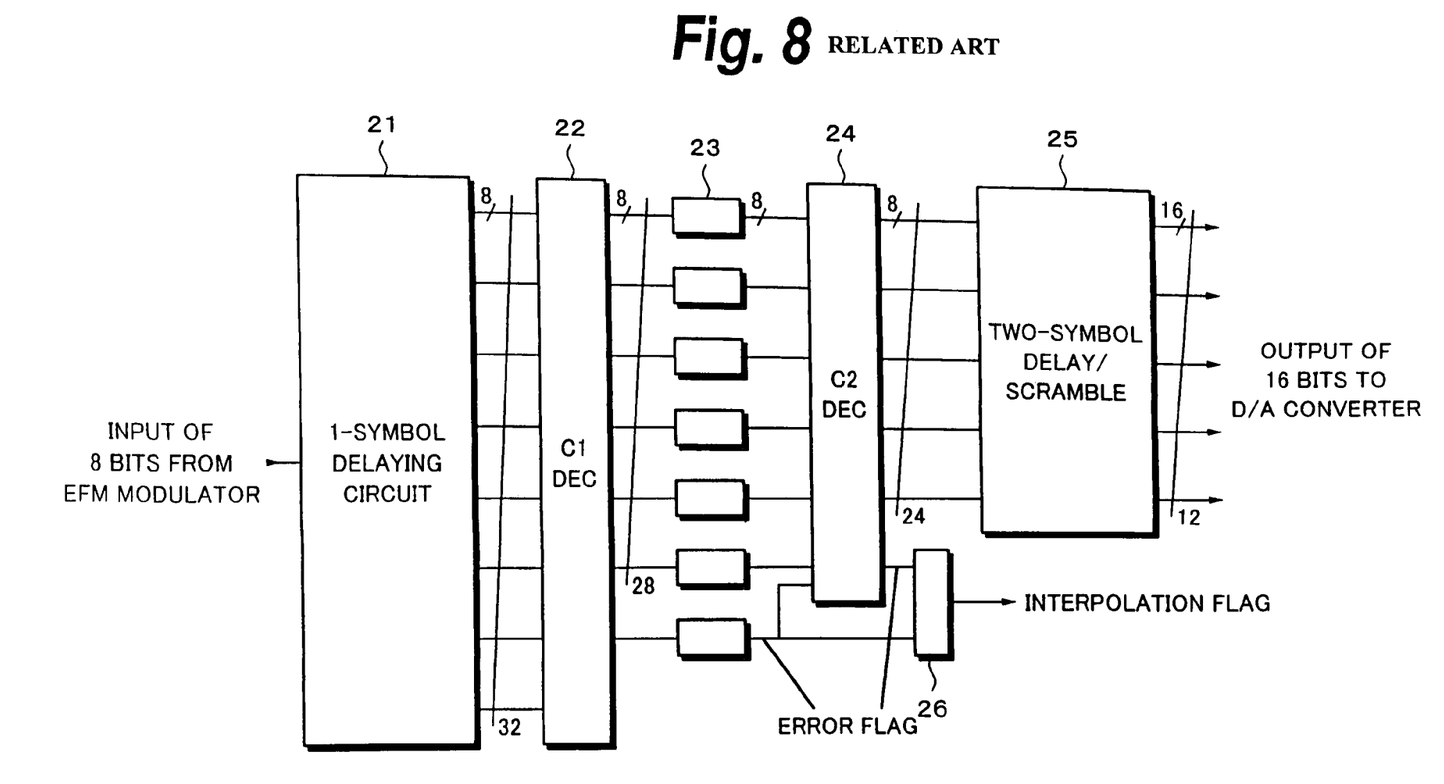
FIG. 8 is a block diagram showing an example of a CIRC decoder.
Figure 9:
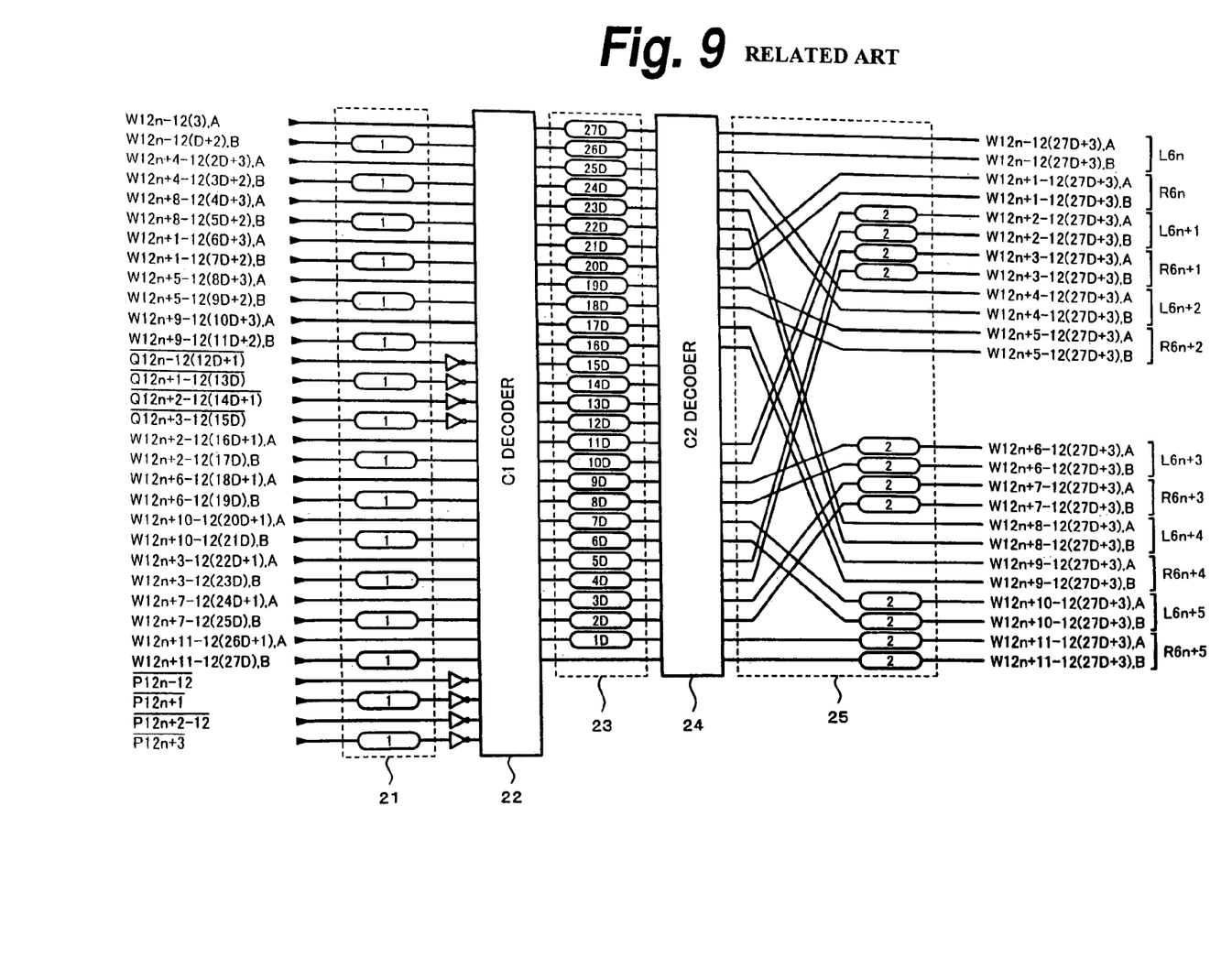
FIG. 9 is a more detailed block diagram showing the example of the CIRC decoder.

FIG. 8 and FIG. 9 are block diagrams showing a flow of a decoding process. The decoding process is performed in the reverse order of the encoding process. Reproduced data that is output from the EFM demodulating circuit is supplied to a one-symbol delay circuit 21. The delay of data by the one-symbol delay circuit 15 on the encoding side is cancelled by the circuit 21.

An output of 32 symbols of the one-symbol delay circuit 21 is supplied to a C1 decoder 22. An output of the C1 decoder 22 is supplied to a de-interleave circuit 23. The de-interleave circuit 23 gives delay amounts that vary in arithmetic series such as 27D, 26D, . . . , D, and 0 to 28 symbols so as to cancel the delays by the interleave circuit 13. The de-interleave circuit 23 has a unit delay amount D=4 frames.

Figure 10:
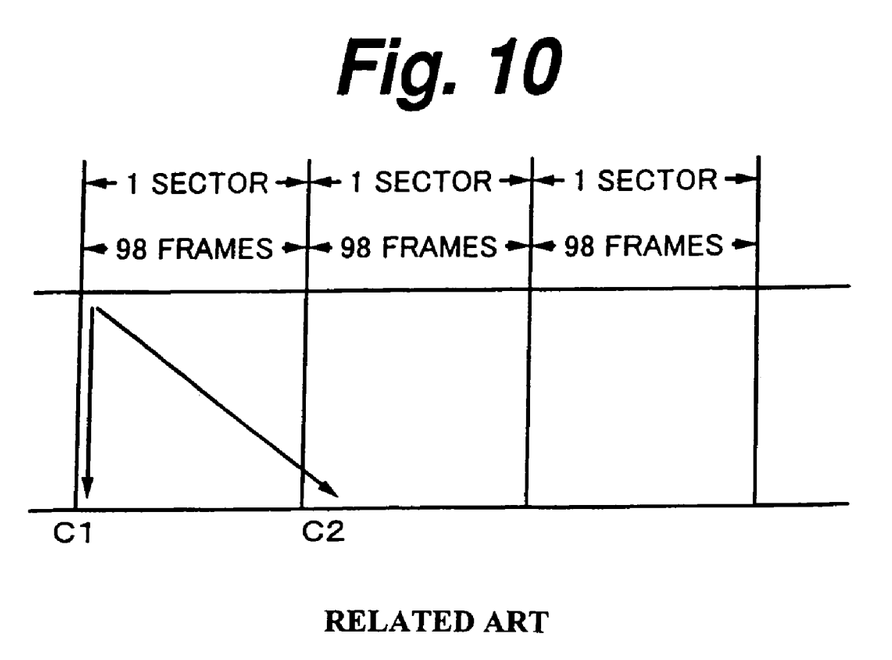
FIG. 10 is a schematic diagram describing a CIRC interleaving process.

As shown in FIG. 10, the unit delay amount D is (D=4). The total interleave length is 109 (=108+1) frames, which is slightly larger than one sector. The total interleave length defines a correction performance against a burst error of which many pieces of data successively become errors due to a fingerprint adhered on a disc, a scratch thereon, and so forth. As the total interleave length is large, the correction performance of the burst error is high.

An output of the de-interleave circuit 23 is supplied to a C2 decoder 24. The C2 decoder 24 performs a C2 code decoding process. An output of 24 symbols of the C2 decoder 24 is supplied to a two-symbol delay/de-scramble circuit 25. From the two-symbol delay/de-scramble circuit 25, decoded data of 24 symbols is obtained. An interpolation flag generating circuit 26 generates an interpolation flag with error flags that are output from the C1 decoder 22 and the C2 decoder 24. With the interpolation flag, data that represents an error is interpolated. Thus, in the CIRC, the error correction code encoding process is performed with the C1 code sequence in the vertical direction and with the C2 code sequence in the diagonal direction. In other words, the error correction code encoding process is dually performed.

Figure 11A:
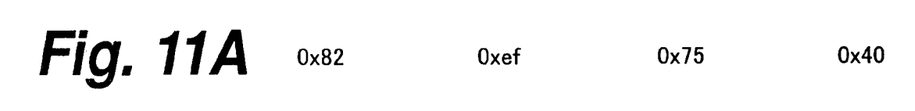
FIGS. 11A to H are schematic diagrams describing an additional recording process according to the embodiment of the present invention.
Figure 11B:
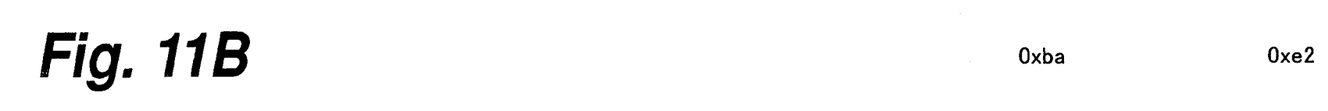

According to the present invention, a part of data in an area that has been encoded with an error correction code is rewritten so as to record desired data for example UDI. FIGS. 11A to H show an example of a data rewriting method. However, for easy understanding, FIGS. 11A to H show an error correction code encoding process simpler than the CIRC. In other words, with data of four symbols (0×82, 0×ef, 0×75, and 0×40) shown in FIG. 11A, a parity of two symbols (0×ba and 0×e2) shown in FIG. 11B is generated. This error correction code encoding process has a performance for correcting a one-symbol error. Binary numbers of real parity symbols represent only code examples. For example, they are parity symbols of the Reed-Solomon code, not values that are obtained by calculations of the error correction code encoding process.

Figure 11C:
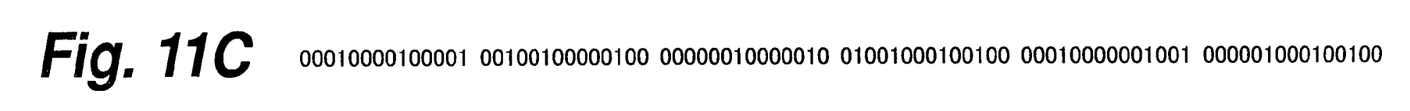
Figure 11D:
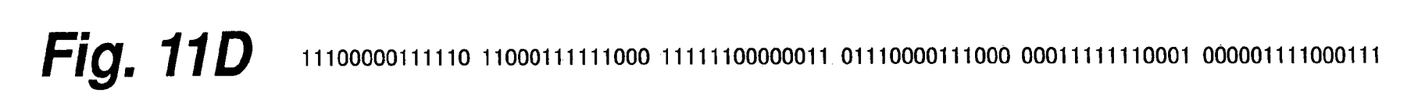

These six symbols are EFM-modulated. As shown in FIG. 11C, each symbol of eight bits is converted into a pattern of 14 bits. Merging bits are not added. In FIG. 11C, "1"

represents an inversion of a level. A pit/land sequence as an uneven pattern on the disc is as shown in FIG. 11D. The period of which "1s" are successive is the period of a pit, whereas the period of which "0s" are successive is the period of a land.

Figure 11E:
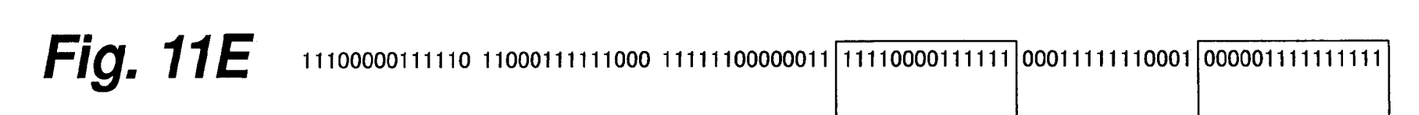
Figure 11F:
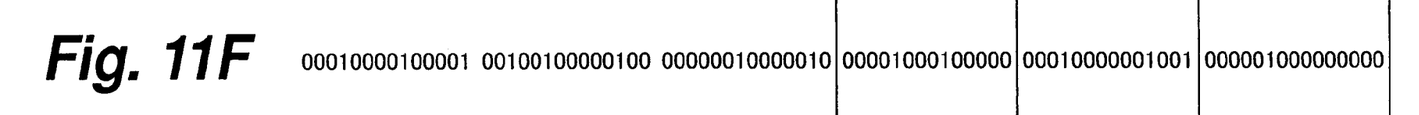

Next, as described with reference to FIG. 3, the additional recording process is performed. In FIG. 11, as represented with boxes, two symbols are rewritten. One symbol is originally (0×40). When the additional recording process is performed for the pit/land sequence shown in FIG. 11D, as shown in FIG. 11E, the pit length becomes long. When a pit/land sequence shown in FIG. 11E is reproduced after the additional recording process has been performed, data of 14 bits shown in FIG. 11F is reproduced.

Figure 11G:
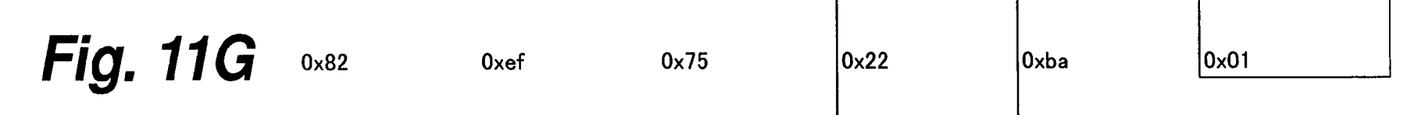
Figure 11H:
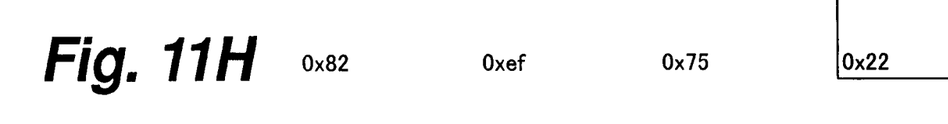

The data of 14 bits is converted into eight bits on the reproducing side. All read data shown in FIG. 11G is obtained. Thus, original data (0×40) is rewritten to (0×22). If only one symbol of six symbols of an error correction code sequence is changed, when they are decoded, an error is detected and corrected. In other words, original data (0×40) is reproduced. In this case, the rewritten data (0×22) cannot be reproduced.

Thus, in the example shown in FIG. 11, a parity symbol (0×e2) is changed to (0×01) so that a data symbol (0×22) that has been additionally recorded is not detected as an error when the data is decoded. When six symbols (0×82, 0×ef, 0×75, 0×22, 0×ba, and 0×01) that include a data symbol that has been rewritten and a parity symbol (0×01) are reproduced and decoded with an error correction code, no error is detected. In other words, as parity symbols in the case that data (0×22) is included, (0×ba) and (0×01) have been obtained. Thus, as shown in FIG. 11H, a data symbol that has been rewritten can be reproduced.

Next, the relation between data that is additionally recorded and desired information for example UDI will be described. On the disc, an area in which data is additionally recorded is pre-defined with an absolute address or the like. FIG. 11 shows an example of such an area. Data that is recorded in the area is defined as predetermined data. Data (0×22) that has been additionally recorded in the foregoing example is different from known data (0×40). Thus, it can be determined that when the data is reproduced, it has been rewritten. The rewritten data (0×22) may be UDI data or a part thereof. In this case, since the types of data that can be additionally recorded are restricted, it is difficult to record many types of data.

Thus, according to the present invention, depending on whether or not known data has been rewritten, one bit of the UDI is represented. When data has been rewritten as an example shown in FIG. 11, it is determined to be "1". When data has not been rewritten, it is determined to be "0". When the area shown in FIGS. 11A to H are disposed N times, N bits can be additionally recorded. In reality, N areas are further repeated so as to multiply record data.

Next, the case that the present invention is applied to the CIRC will be described. In the CIRC, four parity symbols are added. Thus, if an error larger than five symbols takes place, it cannot be determined. Using this phenomenon, five data symbols are rewritten so that an error is not corrected. Thus, a data sequence that has been rewritten can be reproduced.

When a decoding process is performed with the Reed-Solomon code, syndromes are calculated so as to determine whether or not there is an error. The number of syndromes is the same as the number of parity symbols. In the CIRC, four syndromes are calculated. When all syndromes are 0, it is determined that there is no error. Logically, when a parity of four symbols is added, if data of five data symbols is rewritten, all syndromes become 0. However, when a syndrome value is calculated, any numeric value cannot be substituted with any numeric value. Values with which any value can be substituted are restricted.

As described above, due to the restriction in the additional recording process for data, any data cannot be written to any data. Thus, alternatives of data sequences are decided in rewritable combinations each of which is original data and rewritten data. In addition, alternatives of data sequences are decided in consideration of adjacent data. In consideration of these two conditions, a data sequence that can be rewritten and of which the syndrome of the rewritten data sequence becomes 0 is decided.

In the CIRC, as described above, as error correction codes, two codes of C1 code and C2 code are used. Each data symbol is dually encoded with these two code sequences. Thus, a data sequence that has been rewritten is restored to the original data sequence by the second error correction code. As a result, the rewritten data cannot be read. Thus, it is necessary not to cause the two code sequences to correct an error.

As described above, in the CIRC of which a parity of four symbols is added, when five symbols are rewritten, all syndrome values become 0. However, when five symbols are not fixed, it is necessary to add five symbols that satisfy the second error correction code (C1 code). As a result, divergence takes place. When one of five symbols is placed at any position and the other four symbols are placed in an area in which a parity is added, divergence can be prevented.

Figure 12:
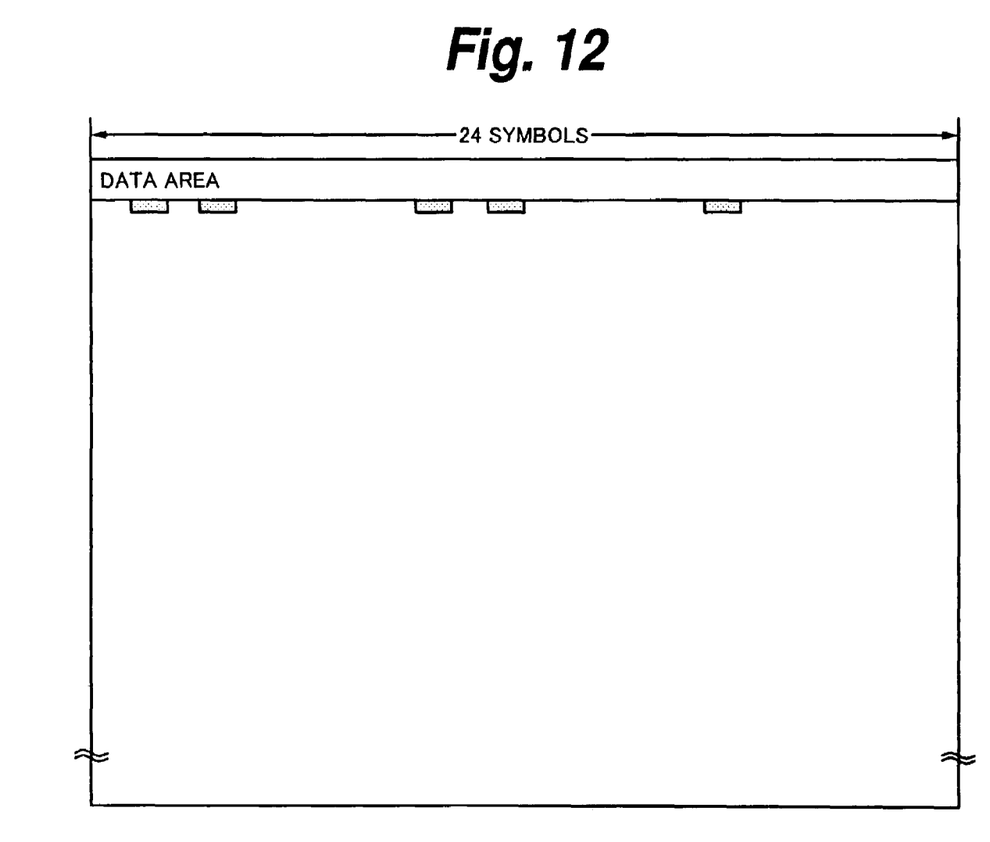
FIG. 12 is a schematic diagram describing an additional recording process in the case the CIRC is used.
Figure 13:
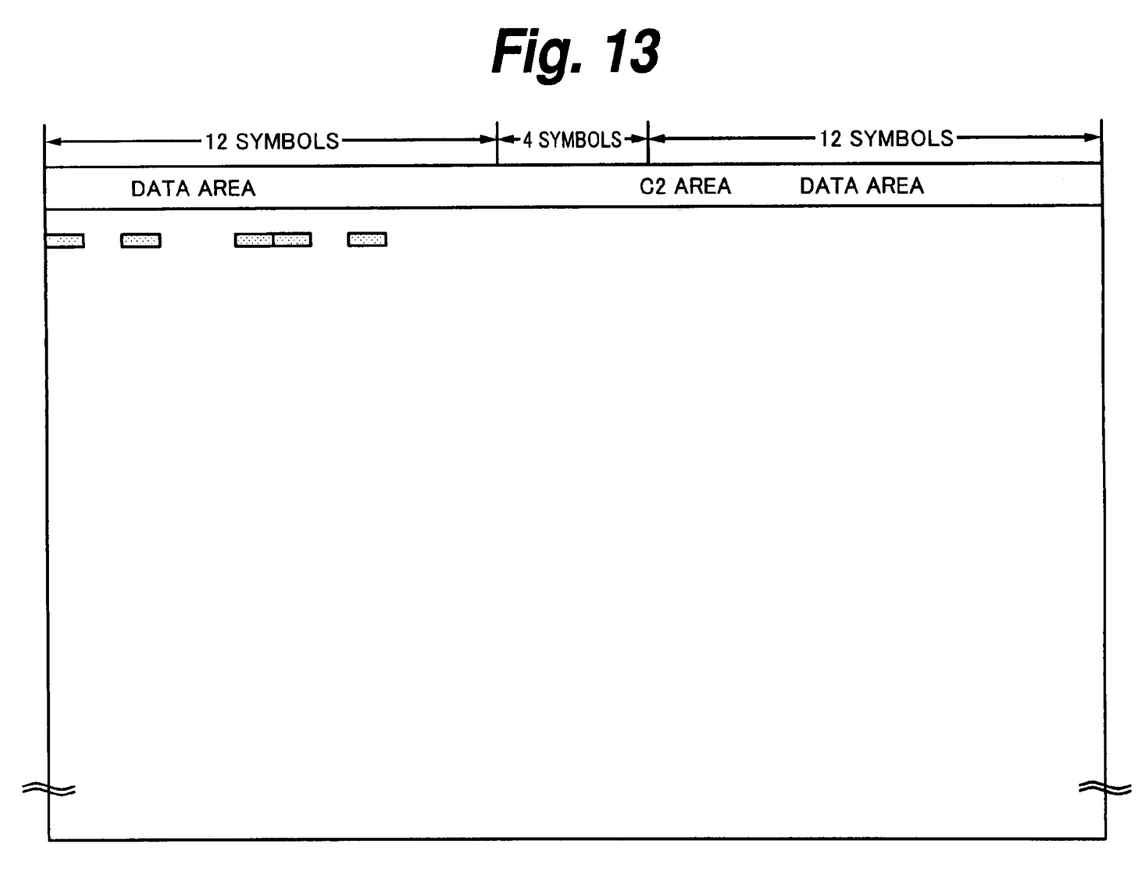
FIG. 13 is a schematic diagram describing the additional recording process in the case that the CIRC is used.

FIG. 12 to FIG. 15 describe the positions of five data symbols to be rewritten in the CIRC. FIG. 12 shows as hatched areas the positions of five data symbols to be rewritten out of 24 symbols of input data. These five data symbols are contained in the same C2 code sequence. When the values of five data symbols are properly selected, all syndrome values that are decoded with the C2 code become 0. FIG. 13 shows as hatched areas the positions of five data symbols on an output side of the C2 encoder.

Figure 14:
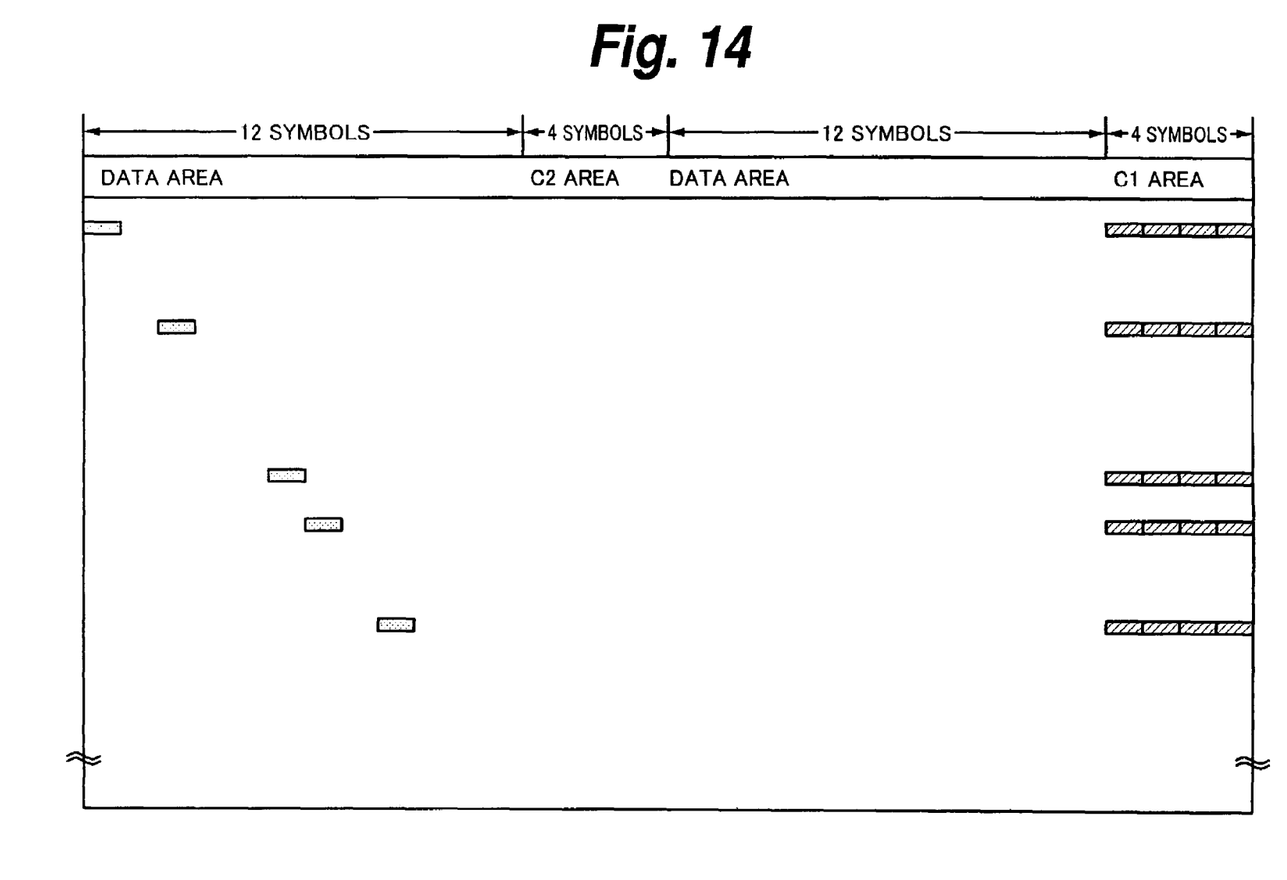
FIG. 14 is a schematic diagram describing the additional recording process in the case that the CIRC is used.
Figure 15:
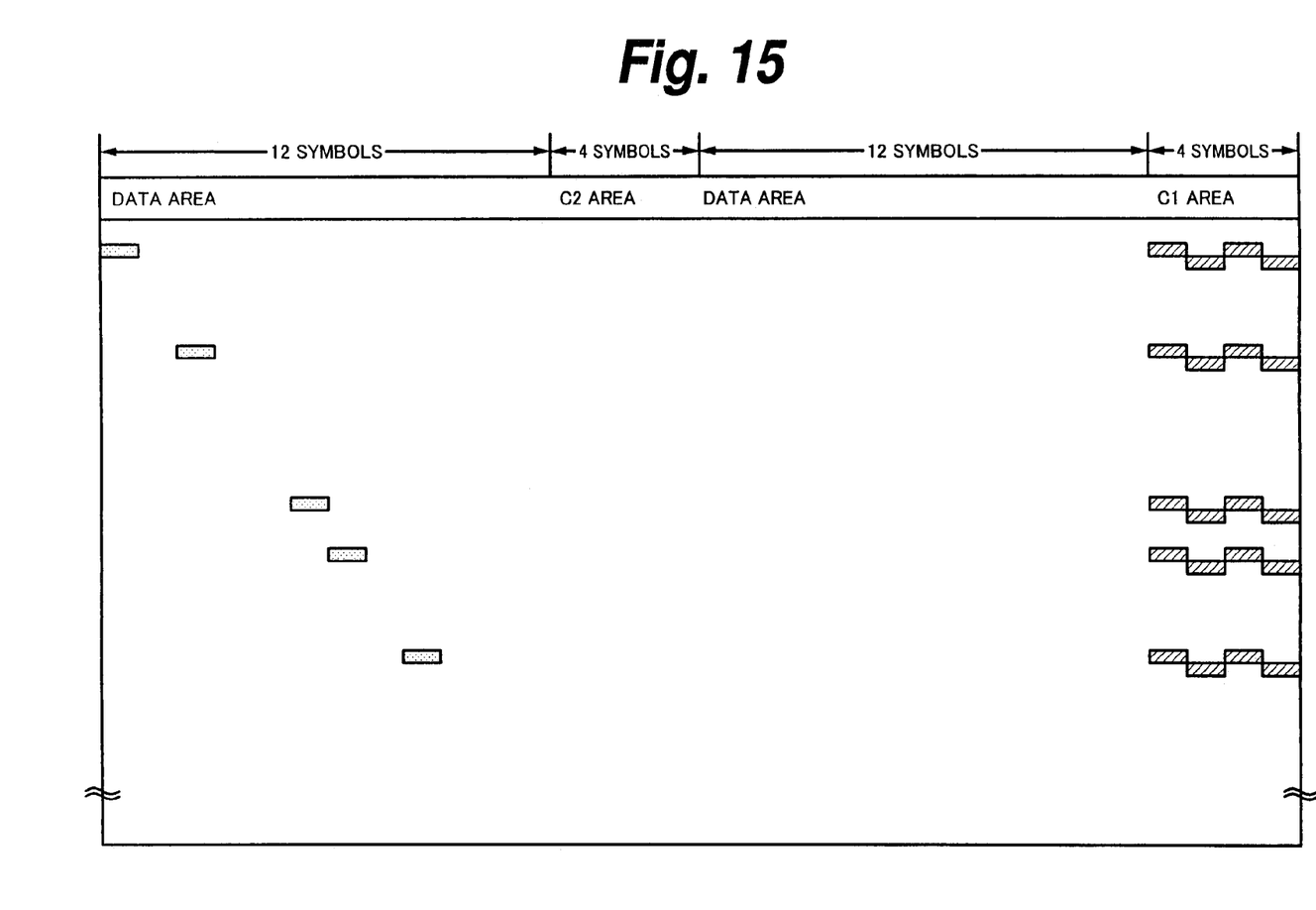
FIG. 15 is a schematic diagram describing the additional recording process in the case that the CIRC is used.

An output of the C2 encoder is interleaved by an interleave circuit and then input to the C1 encoder. FIG. 14 shows as hatched areas the positions of five data symbols on an output side of the C1 encoder. An output of the C1 encoder is supplied to the EFM modulator through the one-symbol delay circuit. FIG. 15 shows as hatched areas the positions of five data symbols that are input to the EFM modulator. As shown in FIG. 14 and FIG. 15, for each of five data symbols to be written, four C1 parity symbols are rewritten so that all syndrome values become 0 when they are decoded with the C1 code. Finally, 25 symbols are rewritten by the additional recording process.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, the present invention is not limited to an additional recording process for a reflective film. In addition, the present invention can be applied to an additional recording process for a phase change film, a magneto-optical recording film, and so forth. Moreover, the present invention can be applied to an multi-session optical disc on which for example CD-DA format data and CD-ROM format data are recorded. As information recorded on an optical disc, there are various types of data such as audio data, video data, still picture data, text data, computer graphic data, game software, and computer programs. In addition, the present invention can be applied to for example a DVD video and a DVD-ROM.

As is clear from the foregoing description, according to the present invention, when an additional recording process is performed for a disc on which data has been recorded, disc identification information or the like can be recorded in an area that has been encrypted with an error correction code. Since the additional recording process can be performed with an error correction code, the applicable range of the additional recording process can be extended.

The invention claimed is:

1. A data recording method comprising steps of:
recording information data in a recording area of a recording medium, said information data being encoded with an error correction code; and
rewriting at least a part of the information data by a rewriting process on a reflective film of the data recording medium having pits and lands as information data, wherein
the at least a part of the information data that is rewritten is recorded so as not to be detected as an error when decoded, and
said rewriting process including interconnecting a portion of adjacent pits so as to merge the adjacent pits into a single pit.

2. The data recording method as set forth in claim 1, wherein predetermined additional information is recorded by rewriting the at least a part of the information data in the recording area encoded with an error correction code.

3. The method of claim 2, wherein said step of recording information data includes encoding said data with a Cross Interleave Reed-Solomon Code.

* * * * *